US011111158B2

United States Patent
Park et al.

(10) Patent No.: US 11,111,158 B2
(45) Date of Patent: *Sep. 7, 2021

(54) CONTROL DEVICE OF LIQUID DISPENSER, LIQUID DISPENSER, AND CONTROL SYSTEM OF LIQUID DISPENSER

(71) Applicant: LG ELECTRONICS INC., Seoul (KR)

(72) Inventors: Jongho Park, Seoul (KR); Kiwon Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,322

(22) Filed: Dec. 19, 2019

(65) Prior Publication Data

US 2020/0123019 A1    Apr. 23, 2020

Related U.S. Application Data

(63) Continuation of application No. 15/789,111, filed on Oct. 20, 2017, now Pat. No. 10,611,647.

(30) Foreign Application Priority Data

Oct. 31, 2016    (KR) .................. 10-2016-0143298

(51) Int. Cl.
*C02F 1/00* (2006.01)
*B01D 35/14* (2006.01)
(Continued)

(52) U.S. Cl.
CPC .............. *C02F 1/008* (2013.01); *B01D 35/14* (2013.01); *B01D 37/04* (2013.01); *B67D 7/08* (2013.01);
(Continued)

(58) Field of Classification Search
CPC .... C02F 1/008; C02F 1/003; C02F 2209/006; C02F 2307/10; C02F 2209/008;
(Continued)

(56) References Cited

U.S. PATENT DOCUMENTS 5,135,645 A    8/1992  Sklenak
5,766,453 A *  6/1998  Morellato .............. B01D 61/08
                                                       141/360
(Continued)

FOREIGN PATENT DOCUMENTS

EP         2728796        5/2014

OTHER PUBLICATIONS

D1(Livpure I-Taste RO Water Purifier With Wi-Fi Launched in India by Press Release, Published on Aug. 11, 2016 (url: https://www.digit.in/press-release/general/livpure-i-taste-ro-water-purifier-with-wi-fi-launched-in-india-31342.html)).

(Continued)

*Primary Examiner* — Joseph W Drodge
(74) *Attorney, Agent, or Firm* — KED & Associates, LLP

(57) ABSTRACT

Provided are a control device of a water purifier, a water purifier, and a control system of a water purifier. The control device of a water purifier includes a communication module transmitting operation information regarding an operation of the water purifier to a central server and receiving control information regarding control of the water purifier from the central server, and a control module generating the operation information and transmitting the generated operation information to the central server through the communication module and controlling an operation of the water purifier on the basis of the control information received from the central server.

20 Claims, 8 Drawing Sheets

(51) Int. Cl.
  *B67D 7/08*   (2010.01)
  *B67D 7/76*   (2010.01)
  *B67D 7/80*   (2010.01)
  *G05B 15/02*  (2006.01)
  *B01D 37/04*  (2006.01)

(52) U.S. Cl.
  CPC ............. *B67D 7/76* (2013.01); *B67D 7/80* (2013.01); *C02F 1/003* (2013.01); *G05B 15/02* (2013.01); *C02F 2209/006* (2013.01); *C02F 2209/008* (2013.01); *C02F 2307/10* (2013.01)

(58) Field of Classification Search
  CPC ... C02F 1/02; C02F 1/18; G05B 15/02; B01D 37/04; B01D 29/0072; B01D 29/60; B01D 29/603; B01D 29/88; B01D 29/92; B01D 35/14; B01D 35/143; B01D 35/18; B01D 2201/54; B67D 7/08; B67D 7/76; B67D 7/766; B67D 1/0857; B67D 3/0009; B67D 3/0022; B67D 7/80; B67D 7/82; B67D 2210/0001; B67D 2210/00099; B67D 2210/00118
  USPC ........ 210/85, 87, 91, 109, 143, 149; 222/23, 222/36, 52, 189.06, 189.11, 146.1, 146.2, 222/146.6
  See application file for complete search history.

(56) References Cited

U.S. PATENT DOCUMENTS

| | | | | |
|---|---|---|---|---|
| 6,207,046 | B1* | 3/2001 | Yamashita | B67D 1/07 210/138 |
| 9,791,838 | B2 | 10/2017 | Park | |
| 10,126,284 | B1* | 11/2018 | Jenkins | F24D 19/1015 |
| 10,611,647 | B2* | 4/2020 | Park | B67D 7/76 |
| 10,745,291 | B2* | 8/2020 | Wu | G06Q 50/06 |
| 2003/0016130 | A1 | 1/2003 | Joao | |
| 2004/0138840 | A1* | 7/2004 | Wolfe | B01D 61/12 702/81 |
| 2006/0020427 | A1 | 1/2006 | Kahn | |
| 2006/0031457 | A1 | 2/2006 | Motoyama | |
| 2006/0163165 | A1 | 7/2006 | Frank | |
| 2008/0314807 | A1 | 12/2008 | Junghanns | |
| 2009/0242074 | A1 | 10/2009 | Carrig | |
| 2010/0116847 | A1* | 5/2010 | Foroughi | B67D 1/0869 222/81 |
| 2010/0305759 | A1* | 12/2010 | Paragot | H04L 67/025 700/271 |
| 2011/0284436 | A1 | 11/2011 | Shin | |
| 2011/0320134 | A1* | 12/2011 | Butler | C02F 1/008 702/25 |
| 2014/0067094 | A1 | 3/2014 | Park | |
| 2014/0070925 | A1 | 3/2014 | Shin | |
| 2014/0216071 | A1 | 8/2014 | Broadbent | |
| 2014/0373926 | A1 | 12/2014 | Jha | |
| 2015/0315008 | A1 | 11/2015 | Locke | |
| 2015/0358177 | A1* | 12/2015 | Lee | G05B 15/02 709/217 |
| 2015/0358364 | A1* | 12/2015 | Lee | H04L 65/1069 709/219 |
| 2016/0052798 | A1* | 2/2016 | Downs | B01J 49/85 210/742 |
| 2016/0085220 | A1* | 3/2016 | Yang | G05B 15/02 700/275 |
| 2016/0129369 | A1 | 5/2016 | Dorfman | |
| 2016/0161310 | A1* | 6/2016 | Leaders | G01F 1/663 702/48 |
| 2016/0218884 | A1 | 7/2016 | Ebrom et al. | |
| 2017/0050130 | A1* | 2/2017 | Bippus | F25D 23/126 |
| 2017/0097647 | A1* | 4/2017 | Lunani | G05B 23/02 |
| 2017/0170979 | A1 | 6/2017 | Khalid | |
| 2017/0293983 | A1* | 10/2017 | Long, II | G06Q 20/18 |
| 2017/0297929 | A1* | 10/2017 | Whitaker | C02F 1/5209 |
| 2018/0074468 | A1* | 3/2018 | Slupik | H04L 12/2803 |

OTHER PUBLICATIONS

Indian Office Action dated Sep. 28, 2020 issued in Application No. 201744037928.

* cited by examiner

FIG. 3

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| FIRST DAY | 0 | 0 | 0 | 0 | 0 | 0 | $t_0$ | $t_1$ | 0 | 0 | 0 | $t_2$ | $t_3$ | 0 | 0 | 0 | 0 | 0 | 0 | 0 | $t_4$ | 0 | 0 | 0 |
| SECOND DAY | 0 | 0 | 0 | 0 | 0 | 0 | $t_5$ | $t_6$ | 0 | 0 | 0 | 0 | $t_7$ | $t_8$ | 0 | 0 | 0 | 0 | 0 | $t_9$ | $t_{10}$ | $t_{11}$ | 0 | 0 |
| THIRD DAY | $t_{12}$ | 0 | 0 | 0 | 0 | 0 | $t_{13}$ | $t_{14}$ | 0 | 0 | 0 | $t_{15}$ | $t_{16}$ | 0 | 0 | 0 | 0 | 0 | 0 | $t_{17}$ | $t_{18}$ | 0 | 0 | 0 |
| FOURTH DAY | 0 | 0 | 0 | 0 | 0 | 0 | $t_{19}$ | $t_{20}$ | 0 | 0 | 0 | $t_{21}$ | $t_{22}$ | 0 | 0 | 0 | 0 | 0 | 0 | $t_{23}$ | $t_{24}$ | 0 | $t_{25}$ | 0 |
| FIFTH DAY | 0 | 0 | 0 | 0 | 0 | 0 | $t_{26}$ | 0 | 0 | $t_{33}$ | 0 | $t_{27}$ | 0 | 0 | 0 | 0 | 0 | 0 | 0 | 0 | $t_{28}$ | $t_{29}$ | 0 | $t_{30}$ |
| SIXTH DAY | $t_{31}$ | 0 | 0 | $t_{32}$ | 0 | 0 | 0 | 0 | 0 | 0 | $t_{34}$ | $t_{35}$ | 0 | 0 | $t_{36}$ | $t_{37}$ | 0 | 0 | 0 | 0 | 0 | 0 | $t_{38}$ | $t_{39}$ |
| SEVENTH DAY | 0 | $t_{40}$ | 0 | 0 | 0 | 0 | 0 | 0 | 0 | 0 | $t_{41}$ | $t_{42}$ | 0 | 0 | 0 | 0 | $t_{43}$ | $t_{44}$ | $t_{45}$ | 0 | $t_{46}$ | 0 | 0 | 0 |
| ... | | | | | | | | | | | | | | | | | | | | | | | | |

CONTROL DEVICE OF LIQUID DISPENSER, LIQUID DISPENSER, AND CONTROL SYSTEM OF LIQUID DISPENSER

CROSS-REFERENCE TO RELATED APPLICATIONS

This application is a Continuation of U.S. application Ser. No. 15/789,111, filed Oct. 20, 2017, which claims priority under 35 U.S.C. § 119 to Korean Application No. 10-2016-0143298, filed on Oct. 31, 2016, whose entire disclosures are hereby incorporated by reference.

BACKGROUND

Field

The present disclosure relates to a control device of a water purifier, a water purifier, and a control system of a water purifier, and particularly, to a control device of a water purifier which can be remotely controlled through communication with a central server, a water purifier, and a control system of a water purifier.

2. Background

A background art of the present disclosure is a control device of a water purifier, a water purifier, and a control system of a water purifier.

A water purifier, a device supplying cold water or hot water to a user, includes various components for supplying cold water or hot water. Components for supplying cold water include a compressor cooling water introduced to the water purifier to lower a temperature of water, a filter, and a valve, and components for supplying hot water include a hot water tank storing introduced water, a heating unit heating the hot water tank to heat water stored in the hot water tank, and a controller controlling the heating unit. In the related art water purifier control technique, a water purifier is operated by determining a usage pattern on the basis of usage history of the water purifier. To this end, the water purifier includes a unit for determining a water ejection pattern of drinking water ejected from the water purifier and operating the water purifier according to the determination. However, the related art has the following limitations.

First, a configuration including the foregoing units cannot be easily made. In order to store usage history of the water purifier, determine a usage pattern on the basis of the usage history, and perform controlling on the basis of the determination, a large capacity storage unit and information processing unit are required, but in terms of characteristics of a water purifier as a compact home appliance, the water purifier is difficult to include such a unit Also, due to the limitation, a configuration according to a technical trend cannot be made. As the technologies of water purifiers move toward compactness and simplification, the configuration of the water purifier including such components runs counter to technical trends. Also, in the home appliance technology field in which power saving techniques and smart home appliance technologies have advanced, a variety of functions, for example, a power saving function, interworking with other devices, remote control/integrated control, and the like, are required, and the aforementioned limitations makes it difficult for water purifiers to become smart devices.

In addition, in that a user's manual operation occupies a large portion in operations of a water purifier, the water purifier may be difficult to effectively and properly operate. That is, the water purifier may operate without reflecting operation information, and thus, the water purifier may not be effectively, properly, and easily operated according to an operation state.

As a result, due to the limitations, the related art water purifier techniques fail to simplify a configuration and diversify functions, advancement which meets the technical trend cannot be made, and thus, promotion of utilization and utility of water purifiers cannot be promoted and user demand and usability cannot be met.

BRIEF DESCRIPTION OF THE DRAWINGS

The embodiments will be described in detail with reference to the following drawings in which like reference numerals refer to like elements, and wherein:

FIG. 3 is a view illustrating an example of operation information according to an embodiment of a control device of a water purifier disclosed in this disclosure;

DETAILED DESCRIPTION

Figure 1:
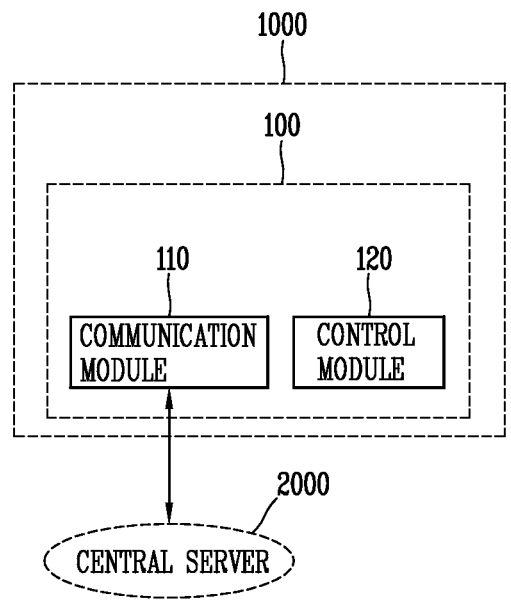
FIG. 1 is a block diagram illustrating a configuration of a control device of a water purifier disclosed in the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated.

The technique disclosed in this disclosure may be applied to a control device of a water purifier, a water purifier, and a control system of a water purifier. In particular, the technique disclosed in this disclosure may be advantageously applied to a water purifier communicating with an external device, a water purifier which is remotely controlled, a water purifier providing a home network service, a home network system including a water purifier, a smart place system, and the like.

However, the techniques disclosed in this disclosure may not be limited thereto and may be applied to any water purifier, any control device included in a water purifier, any control method thereof, any operating method, or any operation control method, and the like, to which the technical concept of the techniques may be applied, and the purpose may be variously applied without being limited.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning.

In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Embodiments of the present disclosure will be described below in detail with reference to the accompanying drawings where those components are rendered the same reference number that are the same or are in correspondence, regardless of the figure number, and redundant explanations are omitted.

In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings.

Figure 2:
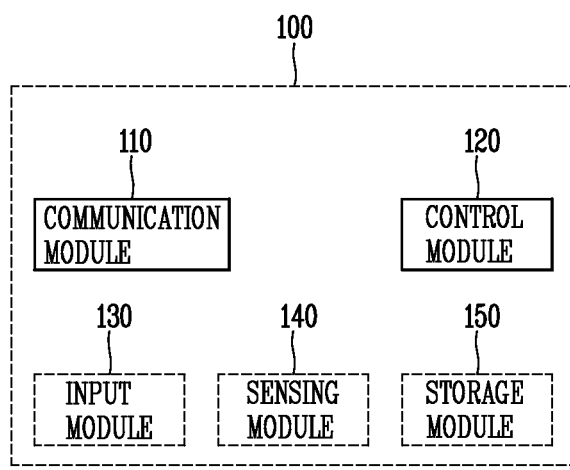
FIG. 2 is a block diagram illustrating a configuration according to an embodiment of a control device of a water purifier disclosed in this disclosure.

First, a control device of a water purifier disclosed in this disclosure will be described with reference to FIGS. 1 to 3. FIG. 1 is a block diagram illustrating a configuration of a control device of a water purifier disclosed in the present disclosure. FIG. 2 is a block diagram illustrating a configuration according to an embodiment of a control device of a water purifier disclosed in this disclosure. FIG. 3 is a view illustrating an example of operation information according to an embodiment of a control device of a water purifier disclosed in this disclosure.

As illustrated in FIG. 1, a control device 100 of the water purifier is included in a water purifier 1000. The water purifier 1000 may be a device for ejecting purified water, cold water, or hot water. The control device 100 may be a control device controlling an operation of the water purifier 1000. The control device 100 may be configured as a printed circuit board (PCB) including a plurality of circuit elements or a plurality of circuit modules for controlling an operation of the water purifier 1000. That is, the control device 100 may be a main board, a microcomputer, or a central processing unit included in the water purifier 1000 and controlling an operation of the water purifier. The control device 100 may control general operations of the water purifier 1000, such as adjusting a flow rate of the water purifier 1000, cooling cold water, heating hot water, opening and closing a valve, filtering, and the like.

As illustrated in FIG. 1, the control device 100 may include a communication module (or transceiver) 110 transmitting operation information regarding an operation of the water purifier 1000 to a central server 2000 and receiving control information regarding control of the water purifier 1000 from the central server 2000 and a control module (or controller) 120 generating the operation information to the central server 2000 through the communication module 100 and controlling an operation of the water purifier on the basis of the control information received from the central server 2000.

That is, the communication module 110 communicates with the central server 2000 and the control module 120 may control an operation of the water purifier 1000. The communication module 110 may be a wireless communication device communicating with the central server 2000.

The communication module 110 may communicate with the central server 2000 under the control of the control module 120. The communication module 110 may communicate with the central server 2000 in a wireless communication manner to transmit and receive data to and from the central server 2000. Data transmitted to or received by the communication module 110 may be processed in the control module 120. The communication module 110 may also communicate with at least one different device other than the central server 2000.

Here, the at least one different device may be a device remotely controlled by the central server 2000. Also, the at least one different device may be a device using the same communication protocol as that of the communication module 110. The communication module 110 may interwork with another device through the central server 2000 or may directly interwork with the other device without the central server 2000.

The control module 120 may be a device controlling general operations of the water purifier 1000, such as adjusting a flow rate of the water purifier 1000, cooling cold water, heating hot water, opening and closing a valve, filtering, and the like. The control module 120 may control components included in the water purifier 1000 to control an operation of the water purifier 1000. The control module 120 may control an operation of the water purifier 1000 according to a command input by an operation of a user of the water purifier 1000.

The control module 120 may control the communication module 100 to control communication with the central server 2000. The control module 120 may generate data regarding control and operation of the water purifier 1000, and process the generated data. The control module 120 may generate data regarding control and operation of the water purifier 1000 and transmit the generated data to the central server 200, or may process data transmitted from the central server 2000.

As illustrated in FIG. 2, the control device 100 including the communication module 110 and the control module 120 may further include one or more of an input module (or user interface) 130, a sensing module (or sensor) 140, and a storage module (or storage) 150.

The input module 130 may receive a processing command regarding an operation of the water purifier 1000. The processing command input to the input module 130 may be used as a basis for the control module 120 to control an operation of the water purifier 1000. For example, a command regarding ejection of cold water or hot water, cooling cold water, heating hot water, and the like, according to a user operation of the water purifier 1000.

The sensing module 140 may sense at least one state value of the water purifier 1000 through one or more sensors provided in the water purifier 1000. The sensing module 140 may include a temperature sensor sensing one or more state values of the water purifier 1000 or sensing one or more state values of the water purifier 1000.

The storage module 150 may store water ejection information of a drink ejected from the water purifier 1000, as data. The storage module 150 may store data processed by the control module 120 or data regarding an operation of the water purifier 1000. The storage module 150 may be a memory device storing data regarding an operation and control of the control module 120, and may be, for example, an EEPROM.

The input module 130, the sensing module 140, and the control module 150 are components assisting a control operation of the control module 120, and the control device 100 may further include any other component related to a control operation of the control module 120.

In the control device 100 configured as described above, the communication module 110 may receive the control information from the central server 2000 and the control module 120 may generate the operation information and transmit the same to the central server 2000 and control an operation of the water purifier 1000 on the basis of the control information received from the central server 2000.

The operation information, information regarding an operation of the water purifier 1000, may be generated by the control module 120. The operation information may be information data regarding an operation of the water purifier 1000.

The operation information may include one or more of history information regarding usage history of the water purifier 1000, operation information of a water ejection unit included in the water purifier 1000, water ejection information of a drink ejected from the water purifier 1000, and state information of the water purifier 1000.

For example, the operation information is illustrated in FIG. 3. The table illustrated in FIG. 3 shows an example of history information regarding usage history of the water purifier 1000 and water ejection information included in the operation information. As illustrated in FIG. 3, the operation information may include history information and water ejection information illustrated in the form of table of an accumulated amount of ejected water by time zones (0 to 23) in units of day (day one to day seven and beyond). Here, t0 to 046 may refer to an accumulated amount of ejected water or a temperature of a drink ejected from the water purifier 1000 for one hour by time zones. The control module 120 may generated the operation information by forming the history information and water ejection information during a predetermined period as illustrated in FIG. 3, as data in the form of table.

The communication module 110 may communicate with the central server 2000 in a wireless fidelity (Wi-Fi) communication manner to transmit and receive data. That is, the communication module 110 may be a Wi-Fi communication module.

The central server 2000 may communicate the communication module 110 in a Wi-Fi communication manner. The central server 2000 may be a communication server provided in the same location as a location of the water purifier 1000 is installed. The central server 2000 may be a communication server provided in a location different from a location where the water purifier 1000 is installed. The central server 2000 may be a home network server remotely controlling a plurality of home appliances including the water purifier 1000. Here, the home network server may refer to a server integratedly remotely controlling one or more home appliances of a home where the water purifier is installed.

The central server 2000 may communicate with one or more other devices than the water purifier 1000 to transmit and receive data to and from the one or more other devices. For example, the central server 2000 may communicate with a user terminal outside the central server 2000, a remote network control device, and the like.

The central server 2000 may also communicate with an external network server. For example, the central server 2000 may communicate with a meteorological office server, a power supply company server, a public office server, a carrier server, and the like, to transmit or receive data information to or from the server. The central server 2000 may store data received from communication target devices and data received from the communication target devices.

The central server 2000 may generate the control information on the basis of one or more of weather information received from the outside, previously stored data information, and the operation information received from the communication module 110 and transmit the generated control information to the communication module 110.

The weather information may include information regarding a date, weather, and season. The weather information may be received from an external user terminal or a weather information providing server.

The previously stored data information may include past history information regarding an operation of the water purifier 1000 or analysis data information regarding the past history information.

The central server 2000 may generate the control information according to a preset algorithm on the basis of the weather information, the previously stored data information, and the operation information, and transmit the control information to the communication module 110. The preset algorithm may refer to an algorithm generating control information for controlling an operation of the water purifier 1000 according to the weather information, the previously stored data information, and the operation information.

That is, the central server 2000 may determine appropriate operation control of the water purifier according to one or more of the weather information, the previously stored data information, and the operation information according to the preset algorithm and generate the control information according to a determination result.

The control information may be information regarding control of one or more of an operation mode of the water purifier 1000, an operation of a water ejection unit included in the water purifier 1000, and water ejection of a drink ejected from the water purifier 1000.

The control information may be control information according to the weather information, the previously stored data information, and the operation information. That is, the control information may be information for controlling an operation of the water purifier 1000 according to the weather information, the previously stored data information, and the operation information.

The control module 120 may control an operation of the water purifier 1000 and generate the operation information on the basis of a result of controlling an operation of the water purifier 1000. The control module 120 may set an operation condition of the water purifier 1000 on the basis of the control information and control an operation of the water purifier 1000 according to the set operation condition.

For example, in cases where the control information is information for controlling setting a temperature of cold water ejected from the water purifier 1000 to x to y[° C.], the control module 120 may set a temperature of the ejected cold water to x to y[° C.] and control an operation of the water purifier 1000 such that cold water is ejected within the set temperature range.

Here, the control module 120 may control an operation of the water purifier 1000 by controlling an operation of the water ejection unit included in the water purifier 1000 such that cold water may be ejected within the set temperature range.

Figure 4:
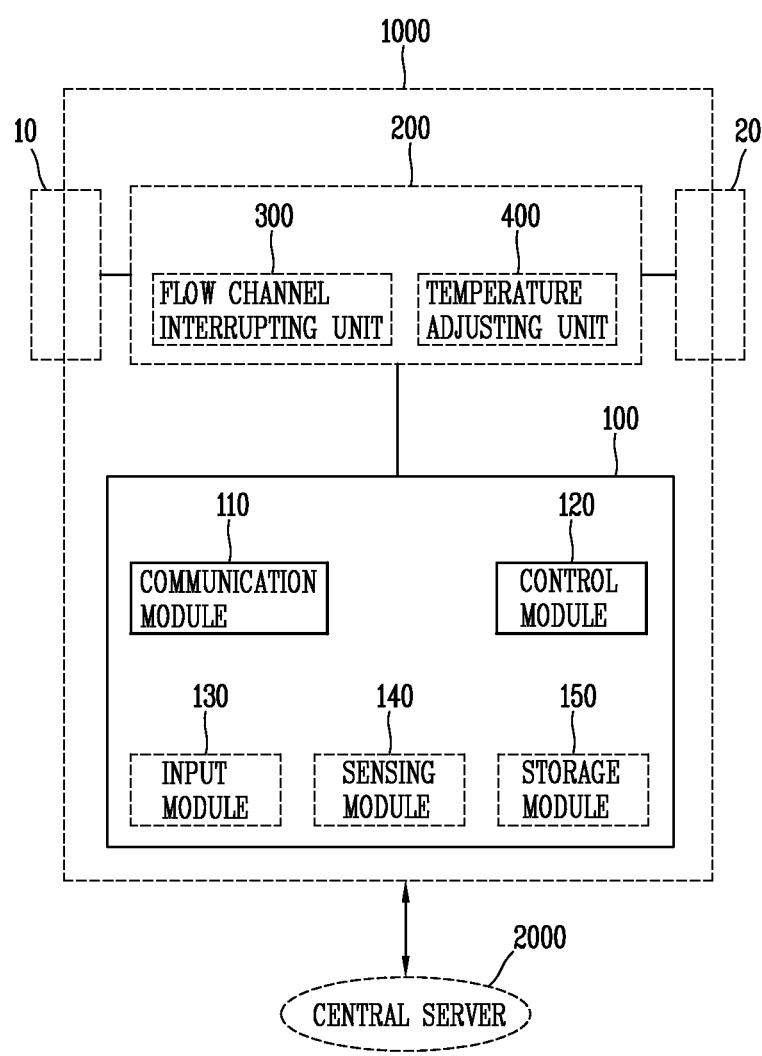
FIG. 4 is a block diagram illustrating a configuration of a water purifier disclosed in this disclosure.
Figure 5:
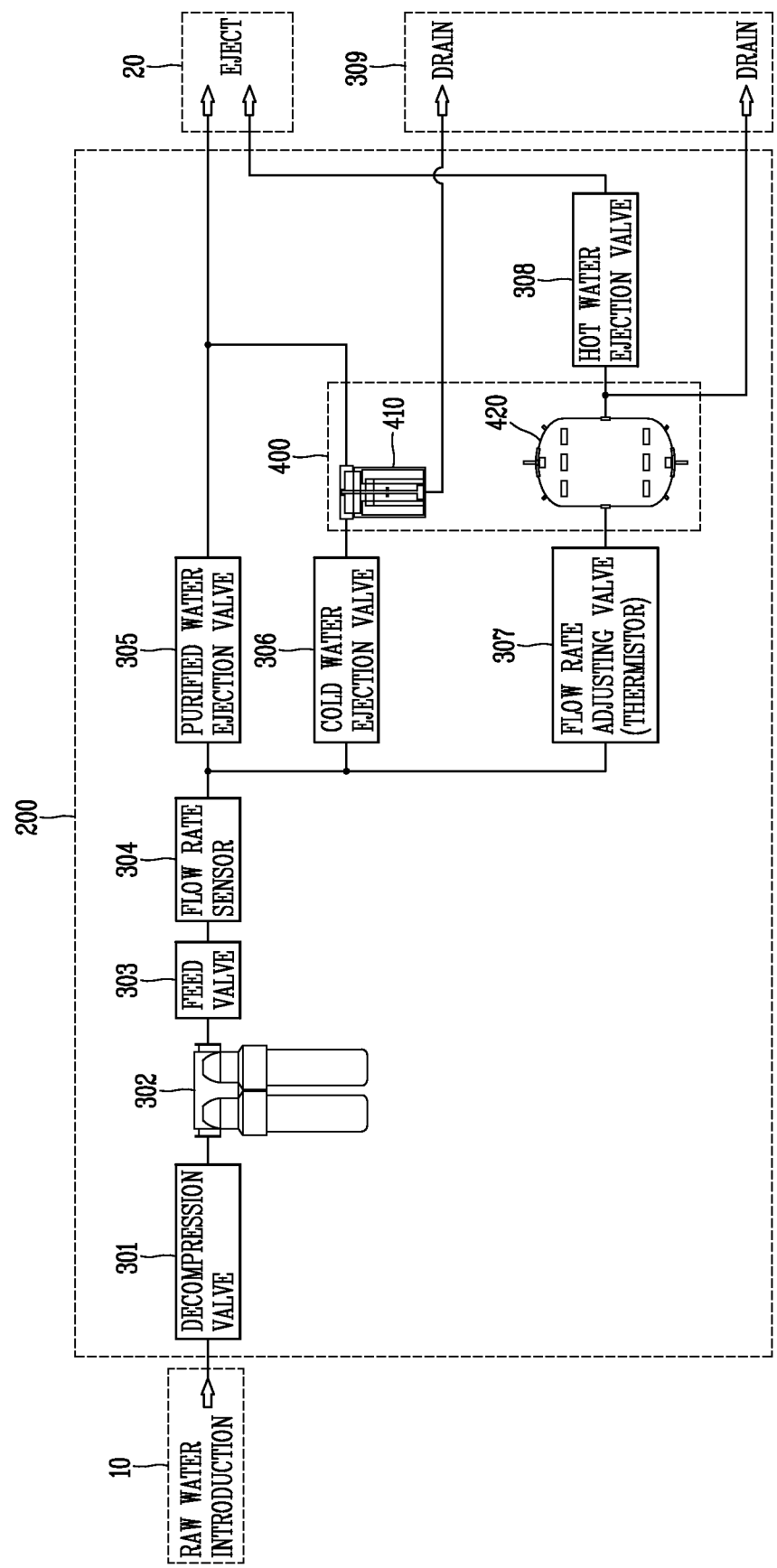
FIG. 5 is a block diagram illustrating a configuration of a flow channel interrupting unit according to an embodiment of a water purifier disclosed in this disclosure.
Figure 6:
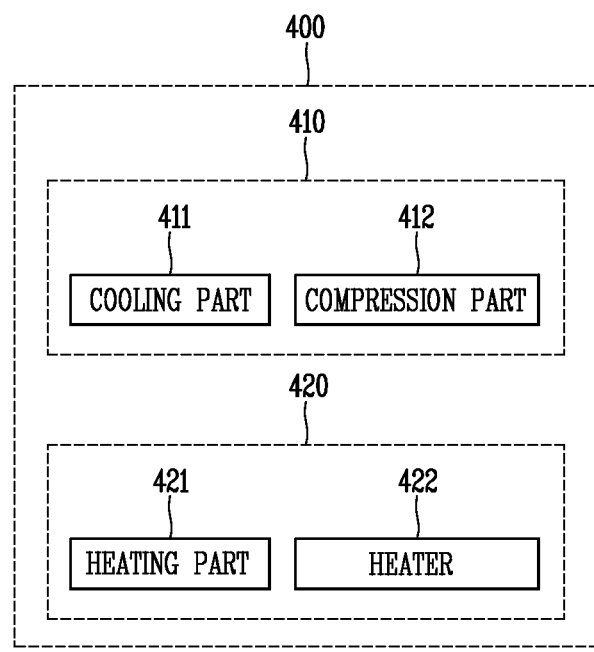
FIG. 6 is a block diagram illustrating a configuration of a temperature adjusting unit according to an embodiment of a water purifier disclosed in this disclosure.

Hereinafter, the water purifier disclosed in this disclosure will be described with further reference to FIGS. 4 to 6. FIG. 4 is a block diagram illustrating a configuration of a water purifier disclosed in this disclosure. FIG. 5 is a block diagram illustrating a configuration of a flow channel interrupting unit according to an embodiment of a water purifier disclosed in this disclosure. FIG. 6 is a block diagram illustrating a configuration of a temperature adjusting unit according to an embodiment of a water purifier disclosed in this disclosure.

The water purifier 1000 may be a direct type water purifier. The direct type water purifier may refer to a water purifier cooling or heating water to eject cold water or hot water, unlike a storage type water purifier which ejects cold water or hot water stored in a water tank.

As illustrated in FIG. 4, the water purifier 1000 may include an inlet 10 to which raw water is introduced, a water ejection unit (or ejector) 20 ejecting a drink to the outside, a flow channel interrupting unit (or flow channel valve) 300 controlling a flow channel from the inlet 10 to the water ejection unit 20, a temperature adjusting unit (heater/cooler) 400 adjusting a temperature of a drink ejected from the water ejection unit 20, and a controller 100 controlling the inlet 10, the water ejection unit 20, the flow channel interrupting unit 300, or the temperature control unit 400 to control an operation of the water purifier 1000.

Here, the controller 100 may be the aforementioned control device 100. That is, the water purifier 1000 may be a water purifier including the aforementioned control device 100. The inlet 10 may allow raw water to be introduced thereto from the outside. The raw water introduced to the inlet 10 may be purified, cooled or heated through the flow channel interrupting unit 300 and the temperature adjusting unit 400.

The water ejection unit 20 may eject purified water, a cooled drink, or a heated drink to the outside through the flow channel interrupting unit 300 and the temperature adjusting unit 400. The water ejection unit 20 may eject purified water, cold water or hot water according to a user operation.

The flow channel interrupting unit 300 and the temperature adjusting unit 400 may purify, cool, or heat raw water introduced through the inlet 10 so that purified water, cold water, or hot water may be ejected through the water ejection unit 20. The flow channel interrupting unit 300 may include one or more filters or valves for interrupting a flow channel from the inlet 10 to the water ejection unit 20.

As illustrated in FIG. 5, the flow channel interrupting unit 300 may include one or more of a decompression valve 301 for interrupting a flow channel to which raw water is introduced or adjusting a flow rate, a filter 302 and a feed valve 303 purifying introduced raw water and adjusting a flow rate, a flow rate sensor 304 sensing a flow rate, a purified water ejection valve 305 interrupting a flow channel through which purified water is ejected, a cold water ejection valve 306 interrupting a flow channel through which cold water is ejected, a flow rate adjusting valve (thermister) 307 adjusting a flow rate of water introduced to the hot water heating unit 420 and measuring a temperature, a hot water ejection valve 308 interrupting a flow channel through which hot water is ejected, and a drain 309 draining purified water of a cold water cooling unit 41 and a hot water heating unit 420.

As illustrated in FIG. 6, the temperature adjusting unit 400 may include one or more of a cooling unit 410 adjusting a temperature of ejected cold water and a heating unit adjusting a temperature of ejected hot water. The cooling unit 410 may include a cooling part 411 cooling cold water ejected from the water ejection unit 20 and a compressing part 412 controlling a temperature of cooling water stored in the cooling part 411.

Here, the compressing part 412 may include a compressor cooling a temperature of the cooling unit and a control unit thereof. The heating unit 420 may include a heating part 421 heating hot water ejected from the water ejection unit 20 and a heater 422 controlling a temperature of the heating part 421. Here, the heater 422 may be an induction heater.

The controller 100 may control the components included in the flow channel interrupting unit 300 and the temperature adjusting unit 400 to control general operations of the water purifier 1000, such as adjusting a flow rate of the water purifier 1000, cooling cold water, heating hot water, opening and closing a valve, filtering, and the like.

The controller 100 may include a communication module 110 transmitting operation information regarding an operation of the water purifier 1000 to a central server 2000 and receiving control information regarding control of the water purifier 1000 from the central server 2000 and a control module 120 generating the operation information to the central server 2000 through the communication module 100 and controlling an operation of the water purifier on the basis of the control information received from the central server 2000.

The controller may communicate with the central server 2000 through the communication module 110 and control an operation of the water purifier 1000 through the control module 120. The controller 100 may further include one or more of the input module 130, the sensing module 140, and the storage module 150.

The controller 100 may receive a processing command regarding an operation of the water purifier 1000 through the input module 130. The processing command input to the input module 130 may be used as a basis for the control module 120 to control an operation of the water purifier 1000.

The controller 100 may sense at least one state value of the water purifier 1000 through one or more sensors provided in the water purifier 1000, through the sensing module 140. The controller 100 may store water ejection information of a drink ejected from the water purifier 1000, as data, through the storage module 150. The operation information, information regarding an operation of the water purifier 1000, may be generated by the control module 120.

The operation information may include one or more of history information regarding usage history of the water purifier 1000, operation information of a water ejection unit included in the water purifier 1000, water ejection information of a drink ejected from the water purifier 1000, and state information of the water purifier 1000.

The controller 100 may communicate the central server 2000 in a Wi-Fi communication manner to transmit and receive data. That is, the communication module 110 may be a Wi-Fi communication module. The central server 2000 may communicate the communication module 110 in a Wi-Fi communication manner.

The central server 2000 may be a home network server remotely controlling a plurality of home appliances including the water purifier 1000. The central server 2000 may generate the control information on the basis of one or more of weather information received from the outside, previously stored data information, and the operation information received from the communication module 110 and transmit the generated control information to the controller 100.

The central server 2000 may generate the control information according to a preset algorithm on the basis of the weather information, the previously stored data information, and the operation information, and transmit the control information to the communication module 110.

The control information may be information regarding control of one or more of an operation mode of the water purifier 1000, an operation of a water ejection unit included in the water purifier 1000, and water ejection of a drink ejected from the water purifier 1000. That is, the control information may be information for controlling the inlet 10, the water ejection unit 20, the flow channel interrupting unit 300, and the temperature adjusting unit 400 according to the weather information, the previously stored data information, and the operation information.

The controller 100 may control an operation of the water purifier 1000 and generate the operation information on the basis of a result of controlling the operation of the water purifier 1000. The controller 100 may set an operation condition of the water purifier 1000 on the basis of the control information and control an operation of the water purifier 1000 according to the set operation condition.

For example, in cases where the control information is information for controlling setting a temperature of cold water ejected from the water purifier 1000 to x to y[° C.], the controller 100 may set a temperature of the ejected cold water to x to y[° C.] and control the flow channel interrupting unit 300 and the temperature adjusting unit 400 such that cold water is ejected within the set temperature range.

Here, the controller 100 may adjust a flow rate by controlling the flow channel interrupting unit 300 and adjust a temperature of ejected cold water by controlling the temperature adjusting unit 400 such that cold water may be ejected within the set temperature range.

Figure 7:
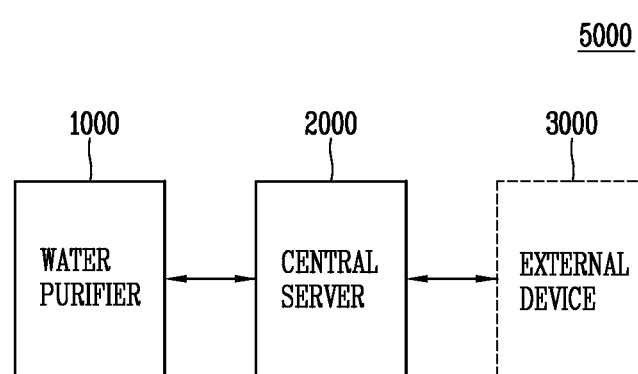
FIG. 7 is a block diagram illustrating a configuration of a control system of a water purifier disclosed in this disclosure.
Figure 8:
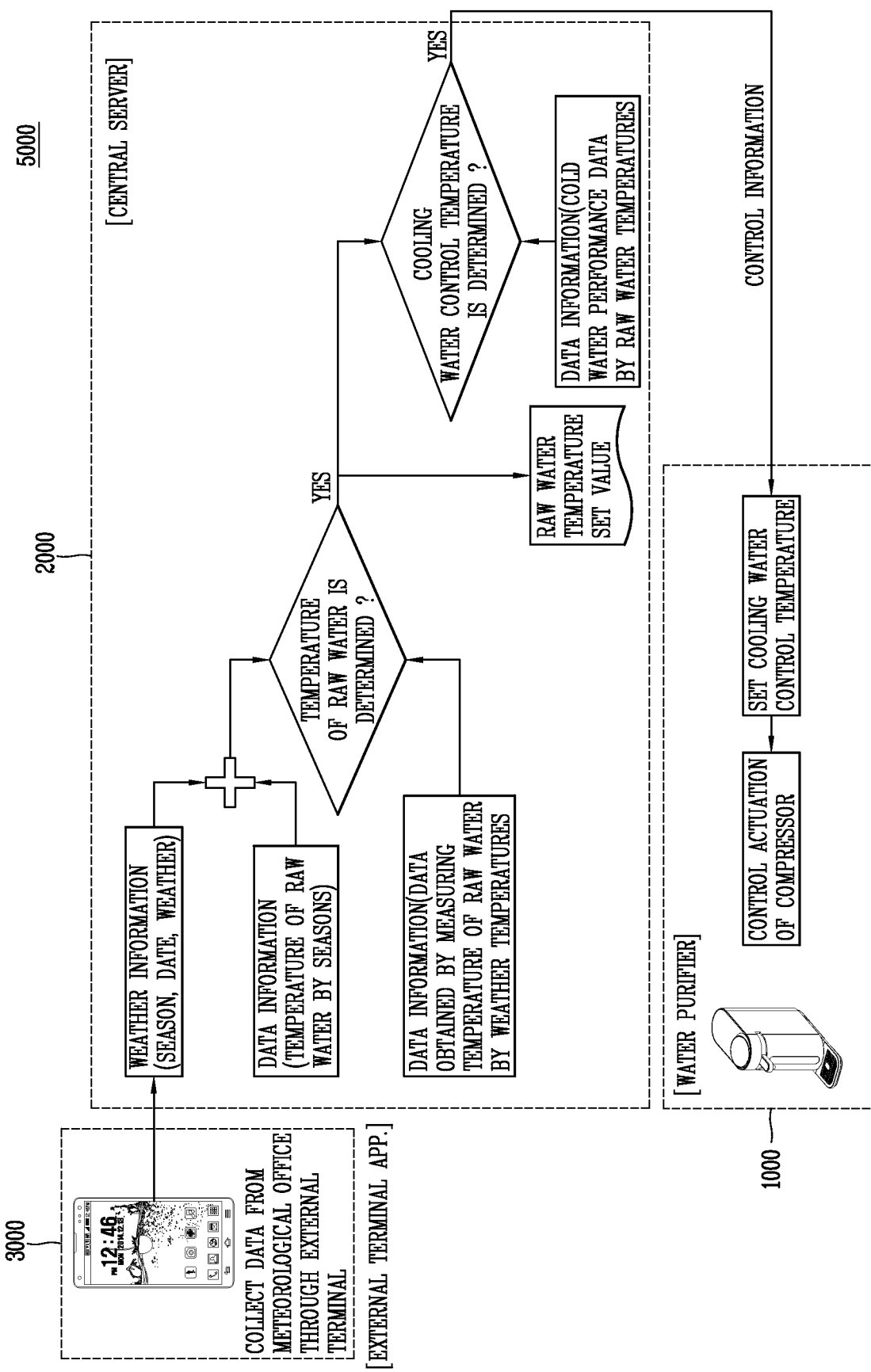
FIG. 8 is a view illustrating an example 1 of controlling and operation according to an embodiment of a control system of a water purifier disclosed in this disclosure.
Figure 9:
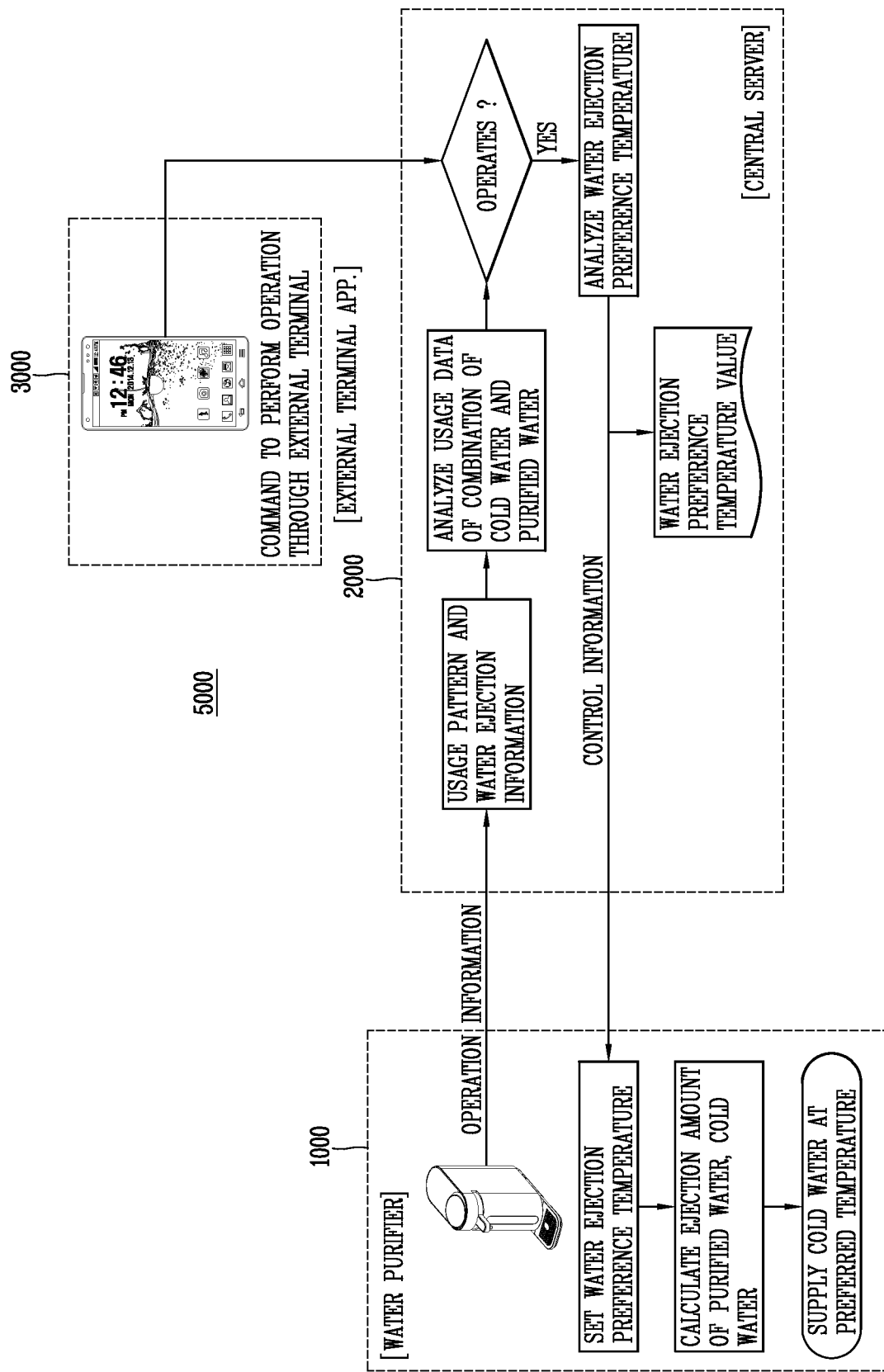
FIG. 9 is a view illustrating an example 2 of controlling and operation according to an embodiment of a control system of a water purifier disclosed in this disclosure.

Hereinafter, a control system (hereinafter, referred to as a "system") of the water purifier disclosed in this disclosure will be described with further reference to FIGS. 7 to 10. FIG. 7 is a block diagram illustrating a configuration of a control system of a water purifier disclosed in this disclosure. FIG. 8 is a view illustrating an example 1 of controlling and operation according to an embodiment of a control system of a water purifier disclosed in this disclosure. FIG. 9 is a view illustrating an example 2 of controlling and operation according to an embodiment of a control system of a water purifier disclosed in this disclosure.

Figure 10:
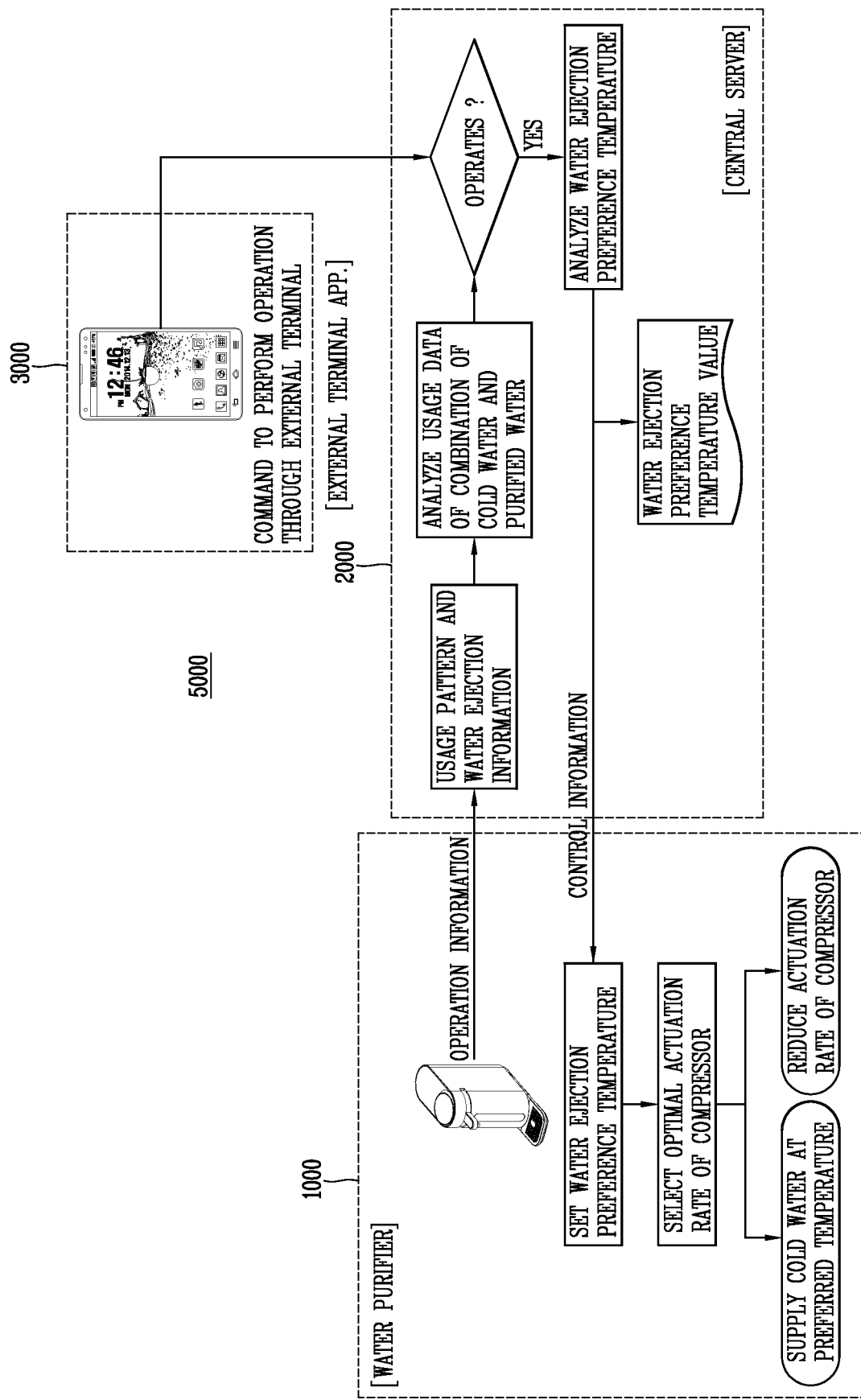
FIG. 10 is a view illustrating an example 3 of controlling and operation according to an embodiment of a control system of a water purifier disclosed in this disclosure.

FIG. 10 is a view illustrating an example 3 of controlling and operation according to an embodiment of a control system of a water purifier disclosed in this disclosure. A system 5000 may be a system remotely controlling the water purifier 1000.

The system 5000 may be a system remotely integratedly controlling a plurality of home appliances including the water purifier 1000. The system 5000 may be a home network system integratedly controlling a plurality of home appliances.

As illustrated in FIG. 7, the system 5000 may include a water purifier 1000 generating operation information regarding an operation and a central server 2000 receiving the operation information from the water purifier 1000, generating control information regarding control of the water purifier 1000 on the basis of the operation information, and transmitting the control information to the water purifier 1000, and the water purifier 1000 operates on the basis of the control information received from the central server 2000.

Here, the water purifier 1000 and the central server 2000 may be the water purifier and the central server described above. That is, the system 5000 may be a system including the water purifier 1000 and the central server 2000 described above. The system 5000 may further include at least one external device 3000 communicating with the central server 2000, in addition to the water purifier 1000 and the central server 2000.

The at least one external device 3000 may be a user terminal remotely controlling one or more devices communicating with the central server 2000, or a remote control device. The at least one external device 3000 may be a communication device of an external network server. For example, the at least one external device 3000 may be a communication device such as a meteorological office server, a power supply company server, a public office server, a carrier server, and the like.

As illustrated in FIG. 4, the water purifier 1000 may include an inlet 10 to which raw water is introduced, a water ejection unit 20 ejecting a drink to the outside, a flow channel interrupting unit 300 controlling a flow channel from the inlet 10 to the water ejection unit 20, a temperature adjusting unit 400 adjusting a temperature of a drink ejected from the water ejection unit 20, and a controller 100 controlling the inlet 10, the water ejection unit 20, the flow channel interrupting unit 300, or the temperature control unit 400 to control an operation of the water purifier 1000.

Here, the controller 100 may be the aforementioned control device 100. The water purifier 1000 may generate the operation information on the basis of an operation result.

The water purifier 1000 may transmit the generated operation information to the central server 2000, receive the control information from the central server 2000, and operate on the basis of the control information received from the central server 2000.

The operation information may include one or more of history information regarding usage history of the water purifier 1000, operation information of a water ejection unit included in the water purifier 1000, water ejection information of a drink ejected from the water purifier 1000, and state information of the water purifier 1000.

The water purifier 1000 and the central sever 2000 may communicate with each other in a Wi-Fi communication manner to transmit and receive data to or from each other. That is, the water purifier 1000 and the central server 2000 may each have a Wi-Fi communication module to communicate with each other through the Wi-Fi communication module. The central server 2000 may communicate with the plurality of home appliances including the water purifier 1000 to remotely control the plurality of home appliances.

The central server 2000 may interwork with the external device 3000 and data may be processed by the external device 3000. For example, when the external device 3000 is a user terminal, a data of the central server 2000 may be processed through an application of the user terminal.

The central server 2000 may generate the control information on the basis of weather information received from the outside, previously stored data information, and the operation information received from the communication module 110 and transmit the generated control information to the water purifier 1000.

The control information may be information regarding control of one or more of an operation mode of the water purifier 1000, an operation of a water ejection unit included in the water purifier 1000, and water ejection of a drink ejected from the water purifier 1000. The control information may be information for controlling the inlet 10, the water ejection unit 20, the flow channel interrupting unit 300, and the temperature adjusting unit 400 included in the water purifier 1000 according to the weather information, the previously stored data information, and the operation information.

The water purifier 1000 may set an operation condition on the basis of the control information and operate by controlling the inlet 10, the water ejection unit 20, the flow channel interrupting unit 300, and the temperature adjusting unit 400 according to the set operation condition.

For example, in cases where the control information is information for controlling setting a temperature of cold water ejected from the water purifier 1000 to x to y[° C.], the water purifier 1000 may set a temperature of the ejected cold water to x to y[° C.] and operate to control the flow channel interrupting unit 300 and the temperature adjusting unit 400 such that cold water is ejected within the set temperature range.

In a specific embodiment of the system 5000 described above, the central server 2000 may determine a cooling water control temperature of the water purifier 1000 on the basis of weather information received from the outside and previously stored data information and generate the control information according to a determination result, and the water purifier 1000 may set the cooling water control temperature on the basis of the control information and operate according to the set cooling water control temperature.

FIG. 8 illustrates a conceptual view of the specific embodiment. As illustrated in FIG. 8, in the system 5000, the central server 2000 may receive the weather information regarding a season/date/weather from an external user terminal or the external device 3000, determine a temperature of raw water introduced to the water purifier 1000 on the basis of the weather information and the previously stored data information (data obtained by measuring temperatures of raw water by seasons and temperatures of raw water by weather temperatures), determine a cooling water control temperature of the water purifier 1000 on the basis of a temperature of raw water and the previously stored data information (cold water performance data by temperatures of raw water), generate the control information according to a determination result, and transmit the generated control information to the water purifier 1000, and the water purifier 1000 may set the cooling water control temperature on the basis of the received control information and operate to control actuation of a compressor for adjusting a temperature of cooling water according to the set cooling water control temperature.

Since a temperature of raw water introduced to the water purifier 1000 is varied depending on season/weather, the water purifier 1000 operates to control a temperature of cooling water according to a temperature of introduced raw water. In detail, due to an influence of season/weather, a temperature of raw water introduced to the water purifier 1000 has variations in a winter or summer season, and here, in the winter season during which a temperature of raw water is low, cold water may be easily cooled due to the low temperature of raw water, compared with the summer season, and conversely, in the summer season during which a temperature of raw water is high, cold water may not be easily cooled due to a high temperature of raw water.

In the winter season, a control temperature of cooling water for cooling cold water may be controlled to be high, compared with the summer season, reducing an actuation duration of a compressor for adjusting a temperature of cooling water, and during the summer season, a control temperature of cooling water may be controlled to be low, compared with the winter season, increasing an actuation duration of the compressor. Thus, an actuation duration of the compressor may be reduced by controlling an operation of the water purifier 1000 according to a weather condition.

That is, when an operation is performed by adjusting a cooling water control temperature according to a weather condition, power consumed in the compressor may be reduced and the operation may be effectively performed.

Also, the central server 2000 may determine a cooling water control temperature of the water purifier 1000 on the basis of temperature information of raw water introduced to the water purifier included in the operation information to generate the control information according to a determination result, and the water purifier 1000 may set the cooling water control temperature on the basis of the control information and operate according to the set cooling water control temperature.

That is, the central server 2000 generates the control information by determining the cooling water control information on the basis of the operation information received from the water purifier 1000, and the water purifier 1000 may operate by controlling actuation of the compressor accordingly.

In another specific embodiment of the system 5000, the central server 2000 may determine a water ejection preference temperature of the user of the water purifier 1000 on the basis of a usage pattern and water ejection information included in the operation information and generate the control information according to a determination result, and the water purifier 1000 may set the water ejection preference temperature on the basis of the control information and operate according to the set water ejection preference temperature.

FIG. 9 illustrates a conceptual view of the specific embodiment. As illustrated in FIG. 9, in the system 5000, the central server 2000 may receive the operation information regarding the usage pattern and the water ejection information of the water purifier 1000 from the water purifier 1000, analyze data regarding the use of a combination of cold water and purified water ejected on the basis of the usage pattern and water ejection information to determine a water ejection preference temperature of the user, generate the control information according to a determination result, and transmit the generated control information to the water purifier 1000, and the water purifier 1000 may set the water ejection preference temperature on the basis of the control information to calculate a water ejection amount of cold water and purified water according to the set water ejection preference temperature, and operate by adjusting a water ejection amount of cold water and purified water such that a drink may be ejected at the water ejection preference temperature.

Here, the water purifier 1000 may adjust a water ejection amount such that a drink may be ejected at the water ejection preference temperature by controlling a valve of a flow channel though which the drink is ejected to the water ejection unit 20.

Also, as illustrated in FIG. 10, the central server may receive the operation information regarding the usage pattern and water ejection information of the water purifier 1000 from the water purifier 1000, analyze data regarding the use of a combination of cold water and purified water ejected on the basis of the usage pattern and water ejection information to determine a water ejection preference temperature of the user, generate the control information according to a determination result, and transmit the generated control information to the water purifier 1000, and the water purifier 1000 may set the water ejection preference temperature on the basis of the control information to select calculate an actuation rate of the compressor according to the set water ejection preference temperature, and operate by adjusting a water ejection temperature of a drink such that the drink may be ejected at the water ejection preference temperature.

Here, the water purifier 1000 may adjust the water ejection temperature such that the drink may be ejected at the water ejection preference temperature by controlling the compressor or a heater for adjusting a temperature of the ejected drink. In the embodiment, the central server 2000 may receive a command signal regarding whether to perform an operation according to the control information of the water purifier 1000 from the user terminal 3000 and transmit the received command signal to the water purifier 1000, and the water purifier 1000 may operate on the basis of the control information according to the command signal.

That is, in the system 5000, the command signal is received through an application of the user terminal 3000, the control information is generated according to the command signal and transmitted to the water purifier 1000, and the water purifier 1000 may operate according to the command signal and the control information, whereby an operation of the water purifier 1000 according to the control information may be selectively performed.

Through the embodiment, a drink based on user preference (the water ejection preference temperature) may be ejected, and also, the compressor or the heater adjusting a temperature of the ejected drink is controlled according to the water ejection preference temperature, whereby an actuation rate of the compressor or the heater may be reduced, user demand may be satisfied, water ejection performance of the water purifier is maintained, and power consumption of the water purifier 1000 may be reduced.

According to the control device of a water purifier, the water purifier, and the control system of a water purifier disclosed in this disclosure, since control and operation may be performed through remote communication with the central server, utilization and usability of the water purifier may be increased.

Also, according to the control device of a water purifier, the water purifier, and the control system of a water purifier disclosed in this disclosure, since controlling is performed on the basis of operation information of the water purifier, the water purifier may be appropriately remotely controlled and operated according to the operation information of the water purifier.

Also, according to the control device of a water purifier, the water purifier, and the control system of a water purifier disclosed in this disclosure, since controlling is performed on the basis of operation information of the water purifier, internal components of the water purifier may be appropriately controlled, reducing power consumption of the water purifier and increasing a life span of the water purifier.

Also, according to the control device of a water purifier, the water purifier, and the control system of a water purifier disclosed in this disclosure, since the central server receives operation information of the water purifier, generate control information on the basis of the received operation information, and transmit the control information to the water purifier to allow the water purifier to operate on the basis of the control information, whereby a configuration of the device for storing and analyzing the operation information of the water purifier may be simplified.

Also, according to the control device of a water purifier, the water purifier, and the control system of a water purifier disclosed in this disclosure, since the central server receives operation information of the water purifier, generate control information on the basis of the received operation information, and transmit the control information to the water purifier to allow the water purifier to operate on the basis of the control information, whereby the water purifier may be integratedly/effectively controlled and operated by the central server.

In this manner, according to the embodiment of the control device of a water purifier, the water purifier, and the control system of a water purifier disclosed in this disclosure, water ejection performance of the water purifier may be maintained and user convenience and demand may be satisfied.

Also, according to the embodiment of the control device of a water purifier, the water purifier, and the control system of a water purifier disclosed in this disclosure, through the aforementioned effects and advantages, usability and application of the water purifier, remote controlling the water purifier, and a home network system including the water purifier, or a smart place system field may be diversified and utilization and efficiency in the art may also be increased.

Therefore, an aspect of the detailed description is to provide a control device of a water purifier, capable of operating a water purifier through remote communication with a central server, a water purifier, and a control system of a water purifier. Another aspect of the detailed description is to provide a control device of a water purifier capable of appropriately remotely controlling and operating a water purifier according to operation information of a water purifier, a water purifier, and a control system of a water purifier.

Another aspect of the detailed description is to provide a control device of a water purifier capable of effectively operating a water purifier and satisfying user convenience and demand, a water purifier, and a control system of a water purifier.

To achieve these and other aspects and in accordance with the purpose of this specification, as embodied and broadly described herein, a control device of a water purifier, a water purifier, and a control system disclosed in this disclosure may perform remote control and operation through communication with a central server.

In detail, operation information regarding an operation of a water purifier may be transmitted to the central server, control information may be received from the central server, based on which the water purifier operates. That is, operation information of the water purifier may be transmitted to the central server, the central server generates appropriate control information according to the operation information and delivers the generated control information to the water purifier, and the water purifier operates on the basis of the control information.

In an aspect, the control device of a water purifier may include: a communication module transmitting operation information regarding an operation of the water purifier to a central server and receiving control information regarding control of the water purifier from the central server; and a control module generating the operation information and transmitting the generated operation information to the central server through the communication module and controlling an operation of the water purifier on the basis of the control information received from the central server.

The operation information may include one or more of history information regarding usage history of the water purifier, operation information of a water ejection unit included in the water purifier, water ejection information of a drink ejected from the water purifier, and state information of the water purifier. The communication module may transmit and receive data to and from the central server through communication in a Wi-Fi communication manner.

The central server may be a home network server remotely controlling a plurality of home appliances including the water purifier. The central server may generate the control information on the basis of one or more of weather information received from the outside, previously stored data information, and the operation information received from the communication module and transmit the generated control information to the communication module.

The control information may be information regarding control of one or more of an operation mode of the water purifier, an operation of the water ejection unit included in the water purifier, and water ejection of a drink ejected from the water purifier. The control module may control an operation of the water purifier and generate the operation information on the basis of a result of controlling an operation of the water purifier. The control module may set an operation condition of the water purifier on the basis of the control information, and control an operation of the water purifier according to the set operation condition.

In another aspect, a water purifier may include: an inlet allowing raw water to be introduced therethrough; a water ejection unit ejecting a drink to the outside; a flow channel interrupting unit interrupting a flow channel from the inlet to the water ejection unit; a temperature adjusting unit adjusting a temperature of a drink ejected from the water ejection unit; and a controller controlling an operation of the water purifier by controlling the inlet, the water ejection unit, the flow channel interrupting unit, and the temperature adjusting unit, wherein the controller may include: a communication module transmitting operation information regarding an operation of the water purifier to a central server and receiving control information regarding control of the water purifier from the central server; and a control module generating the operation information and transmitting the generated operation information to the central server through the communication module and controlling an operation of the water purifier on the basis of the control information received from the central server.

The operation information may include one or more of history information regarding usage history of the water purifier, operation information of a water ejection unit included in the water purifier, water ejection information of a drink ejected from the water purifier, and state information of the water purifier.

The communication module may transmit and receive data to and from the central server through communication in a Wi-Fi communication manner. The central server may be a home network server remotely controlling a plurality of home appliances including the water purifier.

The central server may generate the control information on the basis of one or more of weather information received from the outside, previously stored data information, and the operation information received from the communication module and transmit the generated control information to the communication module. The control information may be information regarding control of one or more of an operation mode of the water purifier, an operation of the water ejection unit included in the water purifier, and water ejection of a drink ejected from the water purifier.

The controller may control an operation of the water purifier and generate the operation information on the basis of a result of controlling an operation of the water purifier. The controller may set an operation condition of the water purifier on the basis of the control information, and control an operation of the water purifier according to the set operation condition.

The controller may set an operation condition of the water purifier on the basis of the control information, and control the inlet, the water ejection unit, the flow channel interrupting unit, or the temperature adjusting unit according to the set operation condition.

In another aspect, a control system of a water purifier may include: a water purifier generating operation information regarding an operation; and a central server receiving the operation information from the water purifier, generating control information regarding control of the water purifier on the basis of the operation information, and transmitting the control information to the water purifier, wherein the water purifier operates on the basis of the control information received from the central server.

The water purifier may include: an inlet allowing raw water to be introduced therethrough; a water ejection unit ejecting a drink to the outside; a flow channel interrupting unit interrupting a flow channel from the inlet to the water ejection unit; a temperature adjusting unit adjusting a temperature of a drink ejected from the water ejection unit; and a controller controlling an operation of the water purifier by controlling the inlet, the water ejection unit, the flow channel interrupting unit, and the temperature adjusting unit.

The controller may include: a communication module transmitting operation information regarding an operation of the water purifier to a central server and receiving control information regarding control of the water purifier from the central server; and a control module generating the operation information and transmitting the generated operation information to the central server through the communication module and controlling an operation of the water purifier on the basis of the control information received from the central server.

The operation information may include one or more of history information regarding usage history of the water purifier, operation information of a water ejection unit included in the water purifier, water ejection information of a drink ejected from the water purifier, and state information of the water purifier.

The communication module may transmit and receive data to and from the central server through communication in a Wi-Fi communication manner. The central server may be a home network server remotely controlling a plurality of home appliances including the water purifier.

The central server may generate the control information on the basis of one or more of weather information received from the outside, previously stored data information, and the operation information received from the communication module and transmit the generated control information to the communication module.

The control information may be information regarding control of one or more of an operation mode of the water purifier, an operation of the water ejection unit included in the water purifier, and water ejection of a drink ejected from the water purifier. The controller may control an operation of the water purifier and generate the operation information on the basis of a result of controlling an operation of the water purifier.

The controller may set an operation condition of the water purifier on the basis of the control information, and control an operation of the water purifier according to the set operation condition. The controller may set an operation condition of the water purifier on the basis of the control information, and control the inlet, the water ejection unit, the flow channel interrupting unit, or the temperature adjusting unit according to the set operation condition.

The operation information may include one or more of history information regarding usage history of the water purifier, operation information of a water ejection unit included in the water purifier, water ejection information of a drink ejected from the water purifier, and state information of the water purifier.

The water purifier and the central server may transmit and receive data to or from each other through communication in a wireless fidelity (Wi-Fi) communication manner. The central server may remotely control a plurality of home appliances including the water purifier through communication with the plurality of home appliances.

The central server may generate the control information on the basis of one or more of weather information received from the outside, previously stored data information, and the operation information received from the communication module and transmit the generated control information to the water purifier.

The control information may be information regarding control of one or more of an operation mode of the water purifier, an operation of the water ejection unit included in the water purifier, and water ejection of a drink ejected from the water purifier.

The central server may determine a cooling water control temperature of the water purifier on the basis of weather information received from the outside and previously stored data information and generate the control information according to a determination result, and the water purifier may set the cooling water control temperature on the basis of the control information and operate according to the set cooling water control temperature.

The central server may determine a cooling water control temperature of the water purifier on the basis of temperature information of raw water introduced to the water purifier included in the operation information to generate the control information according to a determination result, and the water purifier may set the cooling water control temperature on the basis of the control information and operate according to the set cooling water control temperature.

The central server may determine a water ejection preference temperature of a user of the water purifier on the basis of a usage pattern and water ejection information included in the operation information and generate the control information according to a determination result, and the water purifier may set the water ejection preference temperature on the basis of the control information and operate according to the set water ejection preference temperature.

The central server may receive a command signal regarding whether to perform an operation according to the control information of the water purifier from a user terminal and transmit the received command signal to the water purifier, and the water purifier may operate on the basis of the control information according to the command signal.

According to the control device of a water purifier, the water purifier, and the control system of a water purifier disclosed in this disclosure, since control and operation may be performed through remote communication with the central server, utilization and usability of the water purifier may be increased.

Also, according to the control device of a water purifier, the water purifier, and the control system of a water purifier disclosed in this disclosure, since controlling is performed on the basis of operation information of the water purifier, the water purifier may be appropriately remotely controlled and operated according to the operation information of the water purifier.

Also, according to the control device of a water purifier, the water purifier, and the control system of a water purifier disclosed in this disclosure, since controlling is performed on the basis of operation information of the water purifier, internal components of the water purifier may be appropriately controlled, reducing power consumption of the water purifier and increasing a life span of the water purifier.

Also, according to the control device of a water purifier, the water purifier, and the control system of a water purifier disclosed in this disclosure, since the central server receives operation information of the water purifier, generate control information on the basis of the received operation information, and transmit the control information to the water purifier to allow the water purifier to operate on the basis of the control information, whereby a configuration of the device for storing and analyzing the operation information of the water purifier may be simplified.

Also, according to the control device of a water purifier, the water purifier, and the control system of a water purifier disclosed in this disclosure, since the central server receives operation information of the water purifier, generate control information on the basis of the received operation information, and transmit the control information to the water purifier to allow the water purifier to operate on the basis of the control information, whereby the water purifier may be integratedly/effectively controlled and operated by the central server.

In this manner, according to the embodiment of the control device of a water purifier, the water purifier, and the control system of a water purifier disclosed in this disclosure, water ejection performance of the water purifier may be maintained and user convenience and demand may be satisfied.

Also, according to the embodiment of the control device of a water purifier, the water purifier, and the control system of a water purifier disclosed in this disclosure, through the aforementioned effects and advantages, usability and application of the water purifier, remote controlling the water purifier, and a home network system including the water purifier, or a smart place system field may be diversified and utilization and efficiency in the art may also be increased.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the scope of the disclosure will become apparent to those skilled in the art from the detailed description.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system comprising:
    a liquid dispenser including;
        an ejector unit; and
        a flow channel unit having;
            a liquid ejection valve to selectively allow flow of liquid to the ejector unit without temperature modification;
            a cooling unit in series with a cooled liquid ejection valve to selectively allow flow of cooled liquid to the ejector unit; and
            a heating unit in series with a flow rate adjusting valve to selectively allow flow of heated liquid to the ejector unit; and
    a control device including:
        a transceiver to:
            transmit operation information regarding an operation of the liquid dispenser to a server provided separately from the control device, and
            receive control information regarding control of the liquid dispenser from the server; and
        a controller configured to:
            generate the operation information,
            transmit the generated operation information to the server through the transceiver, and
            control an operation of the liquid dispenser based on the control information received from the server,
    wherein the controller controls the liquid ejection valve, the cooled liquid ejection valve, the flow rate adjusting valve, the cooling unit, and the heating unit based on the control information to adjust a flow rate and a temperature of the ejected liquid from the ejector unit,
    wherein the operation information includes:
    history information regarding usage history of the liquid dispenser, operating information of the flow channel unit, and ejection information of the liquid ejected from the liquid dispenser, wherein the operating information relates to operation status of the liquid ejection valve, the cooled liquid ejection valve, the flow rate adjusting valve, the cooling unit and the heating unit,
    wherein at least one of the history information or the ejection information includes information indicating respective aggregate amounts of ejected liquid by times within a prescribed period of at least one day, and
    wherein the ejected liquid includes at least one of a flow of liquid without temperature modification, a flow of cooled liquid, or a flow of heated liquid.

2. The system of claim 1, wherein the operation information further includes:
    state information of the liquid dispenser.

3. The system of claim 1, wherein the transceiver and the server exchange data through Wi-Fi® communications.

4. The system of claim 1, wherein the server is a home network server that remotely controls a plurality of home appliances that includes the liquid dispenser.

5. The system of claim 1, wherein the server generates the control information based on one or more of weather information received from outside the liquid dispenser, previously stored data information, or the operation information received from the transceiver, and transmits the generated control information to the transceiver.

6. The system of claim 1, wherein the control information is information regarding control of one or more of:
    an operation mode of the liquid dispenser,
    an operation of the ejector unit included in the liquid dispenser, or
    an operation of the flow channel unit included in the liquid dispenser,
    wherein the operation mode relates to adjusting at least one of a flow rate of the liquid dispenser, a cooling the liquid, a heating the liquid, or an opening and closing of one or more of the liquid ejection valve, the cooled liquid ejection valve, or the flow rate adjusting valve.

7. The system of claim 1, wherein the controller controls an operation of the liquid dispenser and generates the operation information based on a result of controlling the operation of the liquid dispenser.

8. The system of claim 1, wherein the controller sets an operation condition of the liquid dispenser based on the control information, and controls an operation of the liquid dispenser according to the set operation condition.

9. A liquid dispenser comprising:

an inlet through which liquid is introduced into the liquid dispenser;

an ejector to output liquid out of the liquid dispenser;

a flow channel unit in a flow channel extending between the inlet and the ejector, the flow channel unit including:
- a liquid ejection valve to selectively allow flow of liquid to the ejector without temperature modification,
- a cooling unit in series with a cooled liquid ejection valve to selectively allow flow of cooled liquid to the ejector, and
- a heating unit in series with a flow rate adjusting valve to selectively allow flow of heated liquid to the ejector; and
- a controller configured to control an operation of the liquid dispenser by operating the inlet, the ejector, the liquid ejection valve, the cooled liquid ejection valve, the flow rate adjusting valve, the cooling unit, and the heating unit based on the control information to adjust a flow rate and a temperature of the ejected liquid outputted by the ejector, wherein the controller is connected to a transceiver to transmit operation information regarding an operation of the liquid dispenser to a server provided separately from the controller and to receive control information regarding control of the liquid dispenser from the server; and wherein the controller generates the operation information, transmits the generated operation information to the server through the transceiver, and controls the liquid dispenser based on the control information received from the server through the transceiver, wherein the operation information includes:
- history information regarding a usage history of the liquid dispenser,
- operating information of the flow channel unit, and
- ejection information of liquid ejected from the liquid dispenser, wherein at least one of the history information or the ejection information includes information indicating respective aggregate amounts of ejected liquid by times within a prescribed period of at least one day, and wherein the ejected liquid includes at least one of a flow of liquid without temperature modification, a flow of cooled liquid, or a flow of heated liquid.

10. The liquid dispenser of claim 9, wherein the controller sets an operation condition of the liquid dispenser based on the control information, and controls one or more of the inlet, the ejector, the liquid ejection valve, the cooled liquid ejection valve, the flow rate adjusting valve, the cooling unit, or the heating unit according to the set operation condition.

11. A control system of a liquid dispenser, the control system comprising:

a liquid dispenser to generate operation information regarding an operation of the liquid dispenser; and a server to receive the operation information from the liquid dispenser, generate control information regarding control of the liquid dispenser based on the operation information, and transmit the control information to the liquid dispenser, wherein the liquid dispenser includes:
- an ejector unit;
- a flow channel unit having:
  - a liquid ejection valve to selectively allow flow of liquid to the ejector unit without temperature modification;
  - a cooling unit in series with a cooled liquid ejection valve to selectively allow flow of cooled liquid to the ejector unit, and
  - a heating unit in series with a flow rate adjusting valve to selectively allow flow of heated liquid to the ejector unit; and
- a controller configured to generate operation information regarding the operation of the liquid dispenser, wherein the liquid ejection valve, the cooled liquid ejection valve, the flow rate adjusting valve, the cooling unit, and the heating unit of the flow channel based on the control information received from the server to adjust a flow rate and a temperature of the ejected liquid from the ejector unit, wherein the operation information includes:
- history information regarding a usage history of the liquid dispenser,
- operating information of the flow channel unit, and
- ejection information of liquid ejected from the liquid dispenser, wherein the operating information relates to an operation status of the liquid ejection valve, the cooled liquid ejection valve, the flow rate adjusting valve, the cooling unit and the heating unit, wherein at least one of the history information or the ejection information includes information indicating respective aggregate amounts of ejected liquid by times within a prescribed period of at least one day, and wherein the ejected liquid includes at least one of a flow of liquid without temperature modification, a flow of cooled liquid, or a flow of heated liquid.

12. The control system of claim 11, wherein the operation information further includes state information of the liquid dispenser.

13. The control system of claim 11, wherein the liquid dispenser and the server exchange data through Wi-Fi® communications.

14. The control system of claim 11, wherein the server remotely controls a plurality of home appliances including the liquid dispenser through communication with the plurality of home appliances.

15. The control system of claim 11, wherein the server generates the control information based on one or more of weather information received from outside the liquid dispenser, previously stored data information, or the operation information received from the transceiver, and transmits the generated control information to the liquid dispenser.

16. The control system of claim 11, wherein the control information is information regarding control of one or more of:
- an operation mode of the liquid dispenser,
- an operation of the ejector unit included in the liquid dispenser, or
- operation of the flow channel unit, wherein the operation mode relates to at least one of adjusting a flow rate of the liquid dispenser, a cooling the liquid, a heating the liquid, or an opening and closing at least one of the liquid ejection valve, the cooled liquid ejection valve, or the flow rate adjusting valve.

17. The control system of claim 11, wherein
the server determines a cooling liquid control temperature of the liquid dispenser based on weather information received from outside the liquid dispenser and previously stored data information, and generates the control information further according to the determined cooling liquid control temperature, and
the liquid dispenser operates according to the determined cooling liquid control temperature based on the control information.

18. The control system of claim 11, wherein
temperature information about liquid introduced to the liquid dispenser is included in the operation information,
the server determines a cooling liquid control temperature of the liquid dispenser based on the temperature information about the liquid introduced to the liquid dispenser and generates the control information further according to the determined cooling liquid control temperature, and
the liquid dispenser operates according to the cooling liquid control temperature based on the control information.

19. The control system of claim 11, wherein
the server determines a liquid ejection preference temperature of a user of the liquid dispenser based on a usage pattern and liquid ejection information included in the operation information, and generates the control information further according to the determined liquid ejection preference temperature, and
the liquid dispenser operates according to the liquid ejection preference temperature based on the control information.

20. The control system of claim 19, wherein
the server receives a command signal regarding whether to perform an operation according to the control information of the liquid dispenser from an external user terminal and transmits the received command signal to the liquid dispenser, and
the liquid dispenser operates based on the control information according to the command signal,
wherein the external user terminal is configured to remotely control one or more devices communicating with the server.

* * * * *